United States Patent [19]

Mikuski

[11] Patent Number: 4,564,554
[45] Date of Patent: Jan. 14, 1986

[54] COMPOSITE SHEATHING

[75] Inventor: John J. Mikuski, Adrian, Mich.

[73] Assignee: Anthony Industries, Inc., Commerce City, Calif.

[21] Appl. No.: 642,804

[22] Filed: Aug. 21, 1984

[51] Int. Cl.⁴ .................... B32B 5/24; B32B 5/18; B32B 7/12

[52] U.S. Cl. ................. 428/311.9; 428/317.1; 428/318.4

[58] Field of Search .............. 428/311.7, 311.9, 314.4, 428/314.8, 317.1, 317.3, 317.5, 317.7, 318.4, 319.3, 319.7

[56] References Cited

U.S. PATENT DOCUMENTS

| 2,875,117 | 2/1959 | Potchen et al. | 428/311.9 |
| 3,506,532 | 4/1970 | Bock et al. | 428/311.9 |
| 4,119,750 | 10/1978 | Porter | 428/311.9 |

FOREIGN PATENT DOCUMENTS

| 753004 | 2/1967 | Canada | 428/311.9 |
| 597361 | 1/1948 | United Kingdom | 428/317.1 |
| 1132452 | 11/1968 | United Kingdom | 428/311.7 |
| 1253506 | 11/1971 | United Kingdom | 428/311.9 |
| 1266324 | 3/1972 | United Kingdom | 428/319.3 |
| 1305808 | 2/1973 | United Kingdom | 428/318.4 |

*Primary Examiner*—William J. Van Balen
*Attorney, Agent, or Firm*—Vorys, Sater, Seymour & Pease

[57] ABSTRACT

A laminated composite sheathing is adapted to provide structural support and resist weakening from weathering by providing a thermally insulating layer of foam bonded on one or both faces to a relatively rigid laminated sheet preferably formed of a fiberboard core adhesively secured between facing sheets of kraft paper bonded together with a resilient polymeric material.

8 Claims, 4 Drawing Figures

COMPOSITE SHEATHING

BACKGROUND OF THE INVENTION

1. Field of the Invention

This invention relates generally to weather-resistant fiberboard sheathing and especially to a thermally insulating water-resistant laminate comprising a composite fiberboard panel bonded to one or both sides of a sheet formed from an insulating material.

2. Description of the Prior Art

For a number of years the building industry has employed composite sheathing to provide thermal insulation and to serve as a backing for various facing materials such as stucco or other surface finish material. Typically this conventional sheathing requires the provision of wire or plastic mesh reinforcement on its surface before the application of the facing material. The use of such a mesh is especially necessary to add strength and stability to the facing material, improve adhesion of the facing material and provide impact resistance. These prior requirements for bonding additional mesh or wire materials to the surface of sheathing add to the time required for construction and increase the building costs. Furthermore, in some instances, because of the different coefficients of thermal expansion found in the different materials, there is a breakdown in the properties of the sheathing when exposed to widely varying weather conditions over a period of time. Accordingly, the building industry has for some time sought a sheathing material which would avoid such problems.

SUMMARY OF THE INVENTION

The present invention obviates the prior art need to employ mesh or wire facing procedures with the provision of a sheathing material which (a) has the resiliency needed to adapt to the various weathering conditions, (b) is substantially impermeable to moisture, (c) provides the thermal insulating properties required by the construction industry, (d) has sufficient tensile strength to allow the product to be used in structural applications where racking resistance is desired, (e) has high impact resistance and (f) has sufficient transverse load resistance so that it can be used in building constructions subject to high wind loading.

Accordingly, it is an object of this invention to provide building sheathing having a balanced or symmetrically layered cross section to minimize the warpage or bowing of the panel generated by unequal thermal expansion of the various panel laminations.

Another object is to provide building sheathing for exterior use which does not require a conventional facing such as stucco.

Another object is to provide building sheathing to be used as a substrate for coatings and adhesives which does not require any additional wire or plastic mesh reinforcement by providing the necessary physical properties within the sheathing itself and a surface that provides for a good bond between the sheathing and coating or adhesive.

Yet another object is to provide building sheathing having sufficient resiliency to prevent failure of the interface between the outer surface of the substrate sheathing and any additional coating or surface finish adhered thereto. Such failure is typically a result of the relative differences in movement between the sheathing, which serves as a substrate, and the coating. This movement is often caused by the different coefficients of thermal expansion of the sheathing and surface finish.

Still another object is to provide building sheathing having increased resistance to mold and mildew growth within the laminations so as to prevent premature failure of the product. Mold and mildew resistance is increased by providing barriers adjacent the external surfaces of the sheathing core.

Yet another object of the invention is to increase the resistance of the various interior paper laminations to moisture by providing a moisture-resistant, resilient polymeric material adjacent the outer laminations on each side of the interior laminations so as to protect the interior laminations especially during freezing and thawing cycles.

Yet another object is to provide laminate sheathing adapted to readily serve as a substrate to which a natural or synthetic stucco-type coating or other surface finish may be securely applied.

Another object is to provide insulating sheathing adapted for use as a roofing material and which serves as a substrate for a weather-resistant roof coating.

A further object is to provide building sheathing having sufficient tensile strength to permit its satisfactory use in structural applications requiring racking resistance.

The realization of these objects and various other objects, features and attendant advantages of the present invention will be more fully appreciated from the following detailed description.

BRIEF DESCRIPTION OF THE DRAWINGS

Various other objects, features and attendant advantages of the present invention will be more fully appreciated as the same becomes better understood from the following detailed description when considered in connection with the accompanying drawings, in which the same reference characters designate the same or corresponding parts through the several views and wherein.

DETAILED DESCRIPTION OF THE PREFERRED EMBODIMENTS

The sheathing developed in accordance with the present invention will now be described in conjunction with the accompanying FIG. 1 within which, for example, it is seen that the overall insulating lamination assembly 1 is formed with a substantially rigid sheathing laminate 2 which serves as a rigid backing or supporting laminate to which is subsequently bonded a layer or panel 3 of expanded polystyrene foam or other thermal insulating material. The foam panel 3 has front and back facing surfaces and may contain conventional flame retardant additives. The supporting laminate 2 and the expanded polystyrene foam panel 3 are securely bonded together with a water-resistant adhesive 4 to complete the sheathing lamination assembly 1.

Figure 1:
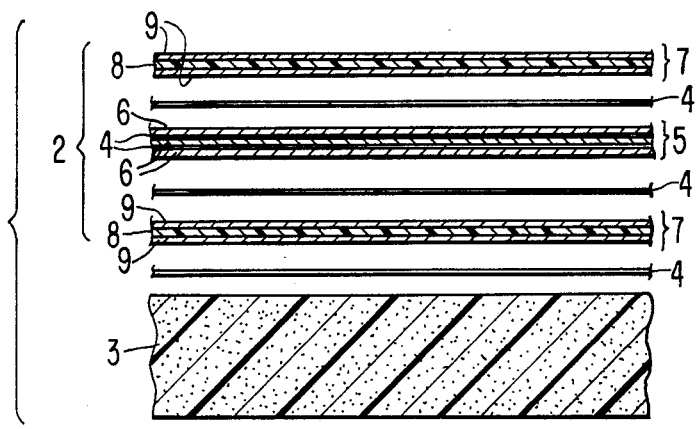
FIG. 1 is a fragmentary, exploded and enlarged cross sectional elevation view of a preferred embodiment of the sheathing showing the various laminations which form the sheathing panel.

As further seen in FIG. 1, the rigid supporting laminate 2 is formed of a plurality of layers of various materials which are symmetrically laminated in a balanced fashion to prevent any significant warping under the influence of thermal or other stress. The supporting laminate 2 includes a laminated fiberboard or chipboard core 5 formed of a plurality of fiber or chipboard layers 6 which are mutually bonded with water-resistant adhesive 4. To each outer face of the chipboard core 5 is applied a lamination or facing sheet 7 formed of a layer of resilient polymeric material such as polyethylene 8 which is sandwiched between two layers of kraft paper 9. The facing sheets 7 are secured to the chipboard core 5 with a water-resistant adhesive 4. Other materials and/or combinations can be used.

Figure 2:
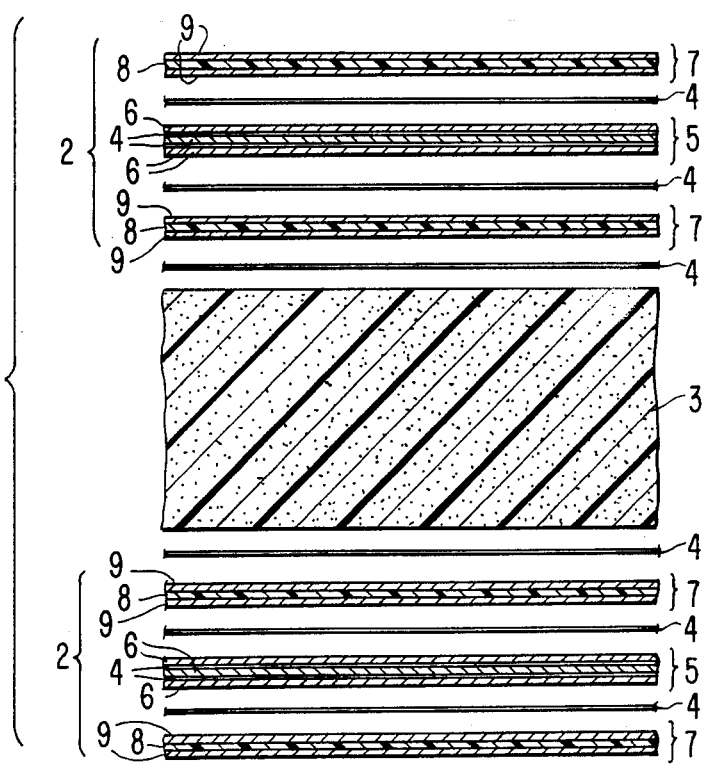
FIG. 2 is a fragmentary, exploded and enlarged cross sectional elevation view of an alternate embodiment of the sheathing having additional laminates disposed so as to form a completely symmetrical cross section through the sheathing.

As shown in FIG. 2, the rigid supporting laminate sheet 2 may be provided on both sides of the expanded polystyrene foam layer 3 to form a more rigid and sturdy lamination assembly having a completely symmetrical cross section. Insulating panels or layers made of materials other than expanded polystyrene may, of course, be used. It has been found that the embodiment of FIG. 1 is of sufficient structural strength and integrity to meet general residential construction requirements, while the embodiment of FIG. 2 is generally more suitable for heavy duty commercial work.

The thickness of the expanded polystyrene foam or other insulating material layer 3 can vary from one-quarter (¼) inch to four (4) inches depending upon the particular end use. However, the standard foam thickness for residential use is one-half (½) inch and the standard foam thickness for commercial use is one (1) inch.

The facing sheets 7 formed of kraft paper 9, polyethylene 8, and kraft paper 9 ("KPK") are generally constructed with two plies of 0.004 inch kraft paper which are extrusion laminated by a layer of molten polyethylene, although adhesives other than polyethylene can be used. The polyethylene will preferably form a lamination layer having a thickness ranging from about 0.001 to about 0.010 inch, although other kraft paper and/or polyethylene thicknesses may also be satisfactory. The molten polyethylene is extruded between the two plies of kraft paper 9. The lamination of sheet 7 is effected within the pressure nip between a pair of opposed rollers in a conventional fashion. It has been found advantageous, although certainly not essential, to use kraft paper 9 having a basis weight of 40 pounds and to bond this kraft paper with the polyethylene layer 8 at a temperature of approximately 600° F. By manufacturing a symmetrical or balanced lamination, warping of the supporting laminate sheet 2 is substantially prevented.

The KPK facing sheet 7 is subsequently laminated to both sides of the water-resistant fiberboard core 5 with a water-resistant adhesive 4. As shown in FIG. 1, the fiberboard core 5 is formed with three plies of water-resistant chipboard 6 each having a thickness of, for example, 0.035 inch, although other thicknesses ranging from about 0.010 to about 0.060 inch are acceptable. It has been found that for many applications a thickness of 0.043 inch is suitable, although the desired number of plies and thickness will depend upon the intended specifications of the finished product.

The lamination of the rigid supporting laminate sheet 2 is done in a continuous operation. Adhesive 4 is applied to the chipboard plies 6 and then the chipboard plies 6 and the KPK laminations 7 pass through several nip roll press sections and are pressure laminated. This combined laminate forms the rigid supporting laminate sheet 2 which is then cut to its finished size. The final thickness of sheet 2 may range from 0.050 to 0.200 inch.

Sheets of the rigid supporting laminate sheet 2 are then laminated to sheets of fire-retardant expanded polystyrene foam or other insulating material 3. The foam panels 3 may be precut to match the shape of the laminate sheets 2. Alternately, the insulating foam panels 3 may be bonded to the laminate sheets 2 and then finish cut. The expanded polystyrene foam layer 3 is, as noted above, bonded to laminate sheets 2 with a layer 4 of water-resistant adhesive. However, other insulating materials may not require adhesive since they can be self adhering to the laminate sheets.

Figure 3:
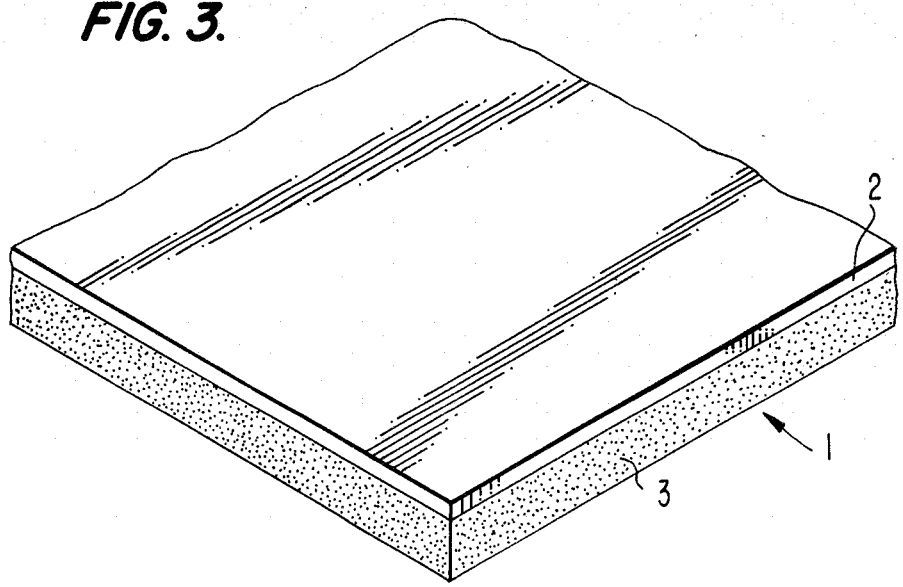
FIG. 3 is a perspective view of the embodiment of FIG. 1.
Figure 4:
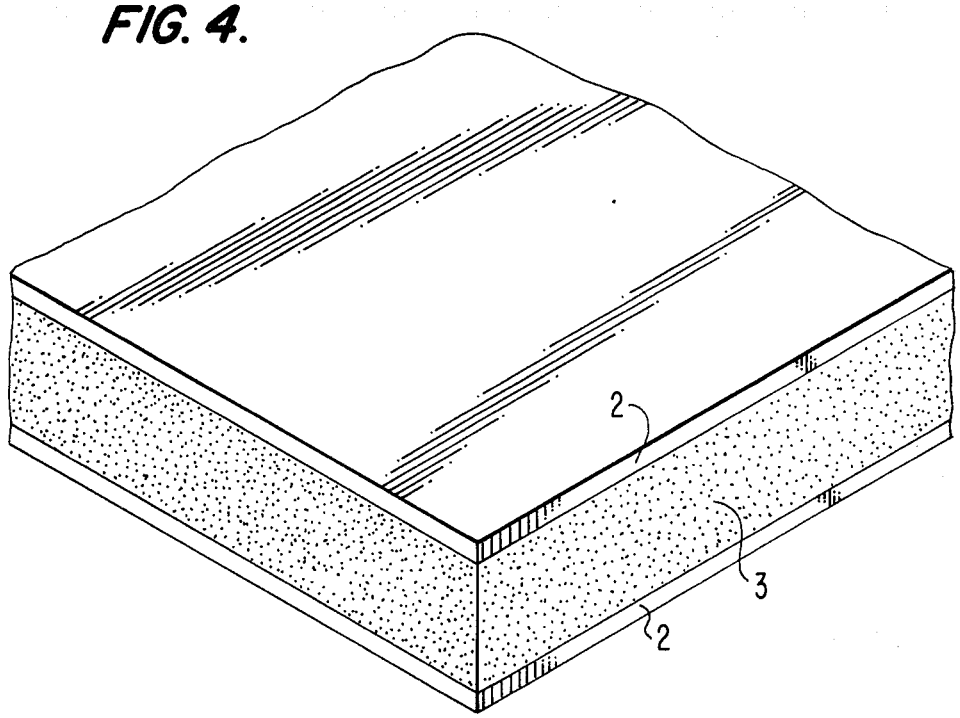
FIG. 4 is a perspective view of the embodiment of FIG. 2.

FIGS. 3 and 4 show perspective views of the composite sheathing lamination assembly of FIGS. 1 and 2, respectively, in their complete form.

The sheathing assembly 1 may serve as a weather-resistant exterior panel since it employs a weather-resistant fiberboard or chipboard laminated core 5 lined on both sides by the KPK construction. Of course, if preferred in such an assembly, other rigid backings could be substituted for the expanded polystyrene foam layer.

The relatively rigid laminate sheet 2 is designed to resist bowing to and to provide a flat surface finish which readily accepts any surface coating, including thin surface coatings which must rely on the substrate laminate sheet 2 to provide the necessary structural stability.

The KPK sandwich construction, wherein KPK is bonded to both sides of the laminated fiberboard or chipboard core 5, provides an additional resilient layer to assist in preventing the failure of the interface between the supporting laminate sheets 2 and any coating or surface finish applied thereto. Moreover, the resilient polyethylene layers 8, or other suitable material in that construction, serve to accomodate relative differences in movement between any surface coating and the laminate sheets 2 due to different coefficients of thermal expansion. Such a KPK arrangement also increases the resistance of the laminated fiberboard or chipboard core to mold and mildew growth, and increases the resistance of the laminate to moisture during freeze-thaw cycling and weathering, all of which are known to cause premature failure of other products.

In addition, by laminating the fiberboard core 5 between opposing laminations of the KPK, the tensile strength of the overall laminated composite sheathing 1 is increased. This is significant when the sheathing is used in structural applications subject to racking or tensile stress. The structure of the expanded polystyrene foam, or other rigid backing, combined with the strength of the supporting laminate 2 strengthens the sheathing 1 to provide improved physical properties including reduced deflection and increased transverse load resistance.

It has been found that the sheathing of this invention accepts synthetic coatings sufficiently well to form an adequate bond for most facing materials. This is a distinct advantage over prior sheathing laminations, which would not accept or bond with, in a sufficiently strong manner, surface treatments such as stucco-type synthetic coatings. Accordingly, the sheathing may be used as a substrate for thin coat systems such as synthetic stucco and weather-resistant roof coatings and as a substrate for a thin layer of adhesive used for attaching facing materials, such as aggregate, thin brick and tile to the sheathing.

Obviously, numerous modifications and variations of the present invention are possible in light of the above teachings. It is therefore to be understood that within the scope of the appended claims, the invention may be practiced otherwise than as specifically described herein.

I claim:

1. A laminated composite sheathing adapted to provide structural support and resist weakening from weathering, comprising:

a panel having front and back facing surfaces and formed from a thermal insulating material; and a supporting laminate sheet bonded to at least one of said panel facing surfaces, comprising a water-resistant fiberboard core adhesively secured between facing sheets.

2. A laminated composite sheathing adapted to provide structural support and resist weakening from weathering, comprising:

a panel having front and back facing surfaces and formed from a thermal insulating material; and a supporting laminate sheet bonded to at least one of said panel facing surfaces, comprising a water-resistant fiberboard core adhesively secured between facing sheets, each of said facing sheets formed from at least two layers of kraft paper bonded together by a layer of a resilient polymer.

3. The laminated sheathing of claim 2, wherein the resilient polymer is polyethylene.

4. The laminated sheathing of claim 2, wherein said thermal insulating material forming said panel comprises a fire-retardant expanded polystyrene foam.

5. The laminated sheathing of claim 2, wherein said supporting laminate sheet is bonded to both facing surfaces of the thermal insulating panel.

6. The laminated sheathing according to claim 2, wherein said supporting laminate sheet is bonded to only one facing surface of the thermal insulating panel.

7. The laminated sheathing according to claim 4, wherein the expanded foam panel has a thickness from approximately 0.25 inch to four inches.

8. The laminated sheathing according to claim 3, wherein the polyethylene layer has a layer thickness of less than approximately 0.010 inch.

* * * * *